Patented Dec. 6, 1932

1,889,835

UNITED STATES PATENT OFFICE

CHARLES D. LOWRY, JR., AND CHARLES G. DRYER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

TREATMENT OF MOTOR FUEL

No Drawing.    Application filed December 18, 1931.    Serial No. 581,986.

This invention relates to the treatment of motor fuels, and refers more particularly to the treatment of cracked distillates of gasoline boiling range, or those containing a substantial proportion of gasoline, such distillates being generally characterized by a relatively high knock rating.

More specifically, the invention has reference to processes of treatment whereby the deterioration of such fuels on storage with respect to gum formation, and particularly anti-knock value, is substantially prevented, under the varying influence of light, air, etc., to which they are subjected.

Prior to the advent of the cracking process as a factor in the trade, the straight run gasolines produced either by simple distillation from crudes or by absorption from casinghead gases were of an essentially saturated character, containing only negligible amounts of olefinic and cyclic hydrocarbons so that they underwent substantially no change when stored for long periods of time, particularly if reasonably protected from the influence of light and air.

When cracked gasolines became an important factor in the trade, it was found that their more unsaturated olefinic constituents such as the di and tri-olefins, and other compounds, were characterized by a tendency to deposit gummy or resinous materials upon standing, particularly under the influence of light and air, and were objectionable constituents on account of this gum-forming tendency and also on account of their loss as possible anti-knock material due to the gum-forming or polymerization reactions. During the gum-forming period in the storage of cracked gasoline, a yellow to brown color may develop which is distinctly undesirable from a sales standpoint. The present invention is directed to preventing the formation of these undesirable gums and coloring materials and the reduction in knock rating of the motor fuel, although it is to be particularly pointed out that gum and color formation and reduction in anti-knock value are not necessarily related, and that the accomplishment of the two objects may not be brought about simultaneously, that is, they may be independent of each other.

While the field of choice for the selection of substances to act as inhibitors in preventing the development of undesirable characteristics in cracked gasolines on storage may be large, and many compounds have been found to be of special value, their use, however, is limited many times by the scarcity of the compound and its high cost of manufacture.

Inhibitors are to be distinguished from anti-knock agents in that the true anti-knock agent modifies the combustion of fuel in an internal combustion engine cylinder but does not necessarily prevent the development of undesirable characteristics under storage. In fact, numerous well-defined anti-knock agents are themselves unstable in storage and the gasoline to which they are added needs further additions of true inhibitors to stabilize the increased anti-knock value produced by the addition of the anti-knock agent. Furthermore, it is usually necessary to use much higher percentages of reagents to prevent knocking than is necessary in inhibiting deterioration and depreciation of the gasoline so that it will be seen that in the great majority of cases the action of anti-knock agents is distinct from that of true inhibitors, the use of which constitutes the present invention.

The present invention is particularly directed to the use of relatively cheap but still very effective materials as inhibitors, and in its most general embodiment comprises the use of tar fractions produced in distilling hardwoods of various types, such as hickory, beech, maple, oak, etc., or mixtures thereof.

The destructive distillation of wood is productive of an extremely large number of decomposition products, among which may be mentioned gases such as carbon dioxide, carbon monoxide, methane and hydrogen, a large number of fatty acids such as acetic, formic and propionic acids, alcohols, aldehydes, phenols, ammonia and ammonia substitution products, aromatic hydrocarbons and complex heterocyclic ring compounds. The yield and type of products vary widely with the source, type and age of the wood distilled and the conditions of distillation, such as use of pressure or vacuum.

We have found that the relatively heavy, oily or tarry portions of the distillates of wood of different types, particularly hardwoods, are practically always utilizable as a source of inhibiting materials for use in determining the deterioration of gasolines in storage, and have also determined, in the case of a number of woods, that particular boiling range fractions may be selected which have superior value in this respect. Analyses of various wood tars have shown the presence of a large number and variety of compounds. The distillates from these wood tars, however, show a much better inhibiting effect than many of the individual compounds contained therein, and further the cost of separation and purification is avoided by the use of the crude distillates.

Many of the compounds reported as present in wood tars are believed to have value when used separately as inhibitors, but the cost of the best ones is considerably greater than the cost of wood tar fractions containing them, and we have further observed that mixtures of inhibitors frequently have greater inhibiting value than the separate components. In the present instance, it is probable that the efficiency of the wood tar fractions is due to their complex composition, and possibly separate compounds whose exact chemical nature is extremely difficult, if not impossible, of determination.

The selection of a hardwood tar or wood tar fraction for use in preventing the deterioration of any given gasoline on storage will be determined by consideration of a large number of factors. Primarily, the chemical composition of cracked and straight-run gasolines from different sources will vary markedly in respect to the percentages of those classes of compounds which require stabilization by the use of inhibitors. For example, when cracked gasolines are produced under relatively high temperatures and low superatmospheric pressures by processes currently known as "vapor phase" cracking processes, the percentages of di and tri-olefins may be relatively high, resulting in a pronounced tendency toward polymerization with attendant depreciation in value of the gasoline stock. In such cases, more highly efficient wood tar fractions may be used, and percentages of the order of from possibly 0.01 to 0.05%. When more nearly saturated gasolines are produced from intermediate petroleum distillates of a relatively saturated character and under higher superatmospheric pressures and lower temperatures, either smaller amounts of the more efficient fractions or the same amounts of relatively less efficient fractions may suffice to effect the required stabilization of properties. In most cases, the proper selection will be readily made by a few experiments and present no unusual difficulties.

To indicate the merits of the invention, some experimental data may be introduced to show the results obtained by the use of wood tar fractions characteristic of the present invention. In obtaining the data shown in the succeeding tabulation, use was made of the oxygen bomb test which at the present time is quite generally accepted as a measure of the tendency of gasolines to deteriorate on storage, an induction period of four hours preceding measurable oxygen absorption having been arbitrarily adopted as indicating a sufficiently stable gasoline.

|  | Original gasoline | Hardwood straight distillate | | Hardwood neutral oil | | Hardwood 240° C.–280° C. fraction | |
|---|---|---|---|---|---|---|---|
| Percentage of inhibitor | | .01 | .05 | .01 | .05 | .01 | .05 |
| Color, saybolt | 30+ | 30+ | 30+ | 30+ | 28 | 30+ | 28 |
| Induction period, minutes | 40 | 180 | 495 | 180 | 420 | 375 | 1515 |

The gasoline utilized in the tests, the results of which are shown above, was produced by the cracking of a highly paraffinic fuel oil from the Pennsylvania field under approximately 300 lbs. per sq. in. pressure and a maximum cracking temperature of 940° F. The gravity of the gasoline was approximately 60° A. P. I., and the end point 410° F. It is particularly to be observed from the table that the 240 to 280° C. fraction produced markedly better results than the other fractions tested, particularly when 0.05% was used, though the induction period of 375 minutes, corresponding to the use of 0.01%, was well over that required in stable gasolines. It is furthermore to be noted that when using the smaller percentage, the color of the gasoline was in no way affected.

The foregoing specification and examples have disclosed the nature of the present invention, but neither should be considered in the light of embodying limitations thereon since it is evidently broad in scope and applicable in many other cases than those given.

We claim:

1. A process for preventing or substantially reducing deterioration of hydrocarbon distillates consisting essentially of gasoline and containing cracked unsaturated hydrocarbons, said process comprising adding to the distillate a small amount of the tar fraction obtained in the destructive distillation of wood, said fraction having the property of substantially inhibiting gum formation in the distillate.

2. Motor fuel comprising cracked gasoline containing a small amount of the tar fraction obtained in the destructive distillation of wood, said fraction having the property of substantially inhibiting gum formation in the motor fuel.

3. A process for preventing or substantially reducing deterioration of hydrocarbon distillates consisting essentially of gasoline and containing cracked unsaturated hydrocarbons, said process comprising adding to the distillate a small amount of the tar fraction obtained in the destructive distillation of hardwood.

4. A process for preventing or substantially reducing deterioration of hydrocarbon distillates consisting essentially of gasoline and containing cracked unsaturated hydrocarbons, said process comprising adding to the distillate a small amount of an oily distillate of hardwood tar.

5. Motor fuel comprising cracked gasoline containing a small amount of the tar fraction obtained in the destructive distillation of hardwood.

6. Motor fuel comprising cracked gasoline containing a small amount of an oily distillate of hardwood tar.

7. A process for preventing or substantially reducing deterioration of hydrocarbon distillates consisting essentially of gasoline and containing cracked unsaturated hydrocarbons, said process comprising adding to the distillate between .01% and .05% of an oily distillate of hardwood tar.

8. Motor fuel comprising cracked gasoline containing between .01% and .05% of an oily distillate of hardwood tar.

CHARLES D. LOWRY, Jr.
CHAS. G. DRYER.